(12) United States Patent
Riese

(10) Patent No.: US 11,358,579 B2
(45) Date of Patent: Jun. 14, 2022

(54) ELECTROHYDRAULIC BRAKE ACTUATOR

(71) Applicant: Robert Bosch GmbH, Stuttgart (DE)

(72) Inventor: Christian Riese, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 16/652,787

(22) PCT Filed: Sep. 12, 2018

(86) PCT No.: PCT/EP2018/074650
§ 371 (c)(1),
(2) Date: Apr. 1, 2020

(87) PCT Pub. No.: WO2019/091629
PCT Pub. Date: May 16, 2019

(65) Prior Publication Data
US 2020/0238965 A1    Jul. 30, 2020

(30) Foreign Application Priority Data

Nov. 9, 2017    (DE) .......................... 102017219920.2

(51) Int. Cl.
*B60T 13/74*    (2006.01)
*B60T 7/04*    (2006.01)
(Continued)

(52) U.S. Cl.
CPC ............ *B60T 13/745* (2013.01); *B60T 7/042* (2013.01); *B60T 8/326* (2013.01); *B60T 8/4081* (2013.01);
(Continued)

(58) Field of Classification Search
CPC ......... B60T 13/745; B60T 11/224; F05B 7/08
See application file for complete search history.

(56) References Cited

U.S. PATENT DOCUMENTS 5,163,744 A * 11/1992 Tierney ................. B60T 8/4266
303/113.2
5,557,935 A *  9/1996 Ganzel .................. B60T 11/224
60/578

(Continued)

FOREIGN PATENT DOCUMENTS

CN    101954903 A    1/2011
CN    102042357 A    5/2011
(Continued)

OTHER PUBLICATIONS

International Search Report for PCT/EP2018/074650, dated Feb. 5, 2019.

(Continued)

*Primary Examiner* — Bradley T King
(74) *Attorney, Agent, or Firm* — Norton Rose Fulbright US LLP; Gerard Messina

(57) ABSTRACT

An electrohydraulic brake actuator for a motor vehicle. The brake actuator has a piston-cylinder unit, whose piston is displaceable by an electric motor via a screw drive. Two pistons are provided, of which initially only a piston having a greater pressure-generating piston surface is displaced in order to build up pressure quickly and subsequently a second piston having a smaller pressure-generating piston surface is displaced in order to increase pressure.

12 Claims, 2 Drawing Sheets

(51) Int. Cl.
  *B60T 8/32* (2006.01)
  *B60T 8/40* (2006.01)
  *B60T 13/14* (2006.01)
  *B60T 13/68* (2006.01)

(52) U.S. Cl.
  CPC ........... *B60T 13/146* (2013.01); *B60T 13/686* (2013.01); *B60T 2270/604* (2013.01); *B60Y 2400/81* (2013.01)

(56) References Cited

U.S. PATENT DOCUMENTS

| | | | |
|---|---|---|---|
| 9,283,940 B2* | 3/2016 | Son | B60T 11/224 |
| 10,683,000 B2* | 6/2020 | Feigel | B60T 7/12 |
| 2014/0090371 A1 | 4/2014 | Yoshizu et al. | |
| 2016/0031426 A1* | 2/2016 | Feigel | B60T 13/662 |
| | | | 303/115.2 |

FOREIGN PATENT DOCUMENTS

| | | | |
|---|---|---|---|
| CN | 102514556 A | 6/2012 | |
| CN | 104554219 A | 4/2015 | |
| DE | 4445975 A1 | 6/1996 | |
| DE | 102013224870 A1 | 9/2014 | |
| EP | 2896541 A1 | 7/2015 | |
| GB | 2579612 A * | 7/2020 | ............. B60T 8/409 |
| JP | H03121324 A | 5/1991 | |
| JP | H11193836 A | 7/1999 | |
| JP | 5838875 B2 | 1/2016 | |
| JP | 2016517371 A | 6/2016 | |
| JP | 2016530165 A | 9/2016 | |
| JP | 6046700 B2 | 12/2016 | |
| WO | 2008025797 A1 | 3/2008 | |
| WO | 2010091883 A1 | 8/2010 | |

OTHER PUBLICATIONS

Office Action dated Mar. 23, 2021 by Japanese Patent Office in corresponding patent application No. 2020-522362.

* cited by examiner

ELECTROHYDRAULIC BRAKE ACTUATOR

The present invention relates to an electrohydraulic brake actuator for generating a brake pressure for operating one or multiple hydraulic wheel brakes. The brake actuator is provided for a power braking action of a motor vehicle (motorcycle or motorcar), but is likewise usable for other vehicles, which have one or multiple hydraulic brakes. For redundancy, it is possible to provide two brake actuators according to the present invention, to which respectively a subset of the wheel brakes of a motor vehicle or of another vehicle are connected.

BACKGROUND INFORMATION

German Patent No. DE 44 45 975 A1 describes a hydraulic wheel brake for a motor vehicle having an electrohydraulic brake actuator, which includes an electric motor, a screw drive, which is drivable by the electric motor and which converts a rotational drive motion of the electric motor into a displacement, and a piston-cylinder unit, whose piston is displaceable in the cylinder for building up a hydraulic pressure via the screw drive. The hydraulic wheel brake is connected to the cylinder of the piston-cylinder unit by interposing a solenoid valve. Such a wheel brake having an electrohydraulic brake actuator may be provided for each vehicle wheel.

SUMMARY

An example electrohydraulic brake actuator according to the present invention has a piston-cylinder unit, a rotation-translation conversion gear, and an electric motor. The rotation-translation conversion gear is rotationally drivable by the electric motor and converts a rotational movement of the electric motor into a displacement, which displaces a piston in a cylinder of the piston-cylinder unit. Conversely, it is also possible to displace the cylinder on the piston.

The rotation-translation conversion gear may include a screw drive, for example a spindle drive or a ball screw. A cam drive, a rack-and-pinion drive, a crankshaft drive or a cam gear are also possible, for example. The list is provided by way of example and is not exhaustive. A mechanical reduction gear, in particular a pinion gear and for example a planetary gear, may be interposed between the electric motor and the rotation-translation conversion gear. The electric motor together with the rotation-translation conversion gear and, if applicable, an interposed reduction gear, may also be understood as an electromechanical actuator.

The displacement of the piston in the cylinder may also be understood as an operation of the piston-cylinder unit. It generates a brake pressure in the cylinder and in one or multiple hydraulic wheel brakes connected to the cylinder, which operates the wheel brake(s).

During a displacement of the piston in the cylinder for generating pressure, the piston-cylinder unit of the electrohydraulic brake actuator reduces a pressure-generating piston surface. The pressure-generating piston surface is a surface of the piston, to which brake fluid is applied and which reduces a volume in the cylinder for generating pressure so as to generate a brake pressure. Multiple pressure-generating surfaces of the piston are also possible. During the displacement, the pressure-generating piston surface may be reduced continuously or in one or multiple steps. The reduction of the pressure-generating piston surface reduces a displacement force required for displacing the piston. It is an advantage of the present invention that at the beginning of the displacement of the piston in the cylinder, a greater pressure-generating piston surface displaces more brake fluid volume per displacement distance from the cylinder and thereby activates one or multiple connected hydraulic wheel brakes quickly and generates a brake force quickly. As stated, the reduction of the pressure-generating piston surface reduces the displacement force required for the further displacement of the piston and for increasing the brake pressure.

Advantageous embodiments and refinements of the present invention are described herein.

The piston-cylinder unit of the example electrohydraulic brake actuator according to the present invention may have two or even more pistons having pressure-generating piston surfaces of different sizes, of which initially, to generate pressure, a piston having a greater or the greatest pressure-generating piston surface is displaced in the cylinder. Subsequently, a piston having a smaller pressure-generating piston surface is displaced in the cylinder in order to increase pressure.

Another possibility is that initially, for generating pressure, two or even more pistons are displaced jointly and subsequently, for increasing pressure, fewer pistons or only one piston are displaced in the cylinder. The pistons may have pressure-generating piston surfaces of equal sizes or of different sizes.

DETAILED DESCRIPTION OF EXAMPLE EMBODIMENTS

The present invention is explained in greater detail below on the basis of specific embodiments illustrated in the figures. The two figures show circuit diagrams of electrohydraulic brake actuators according to the present invention.

Figure 1:
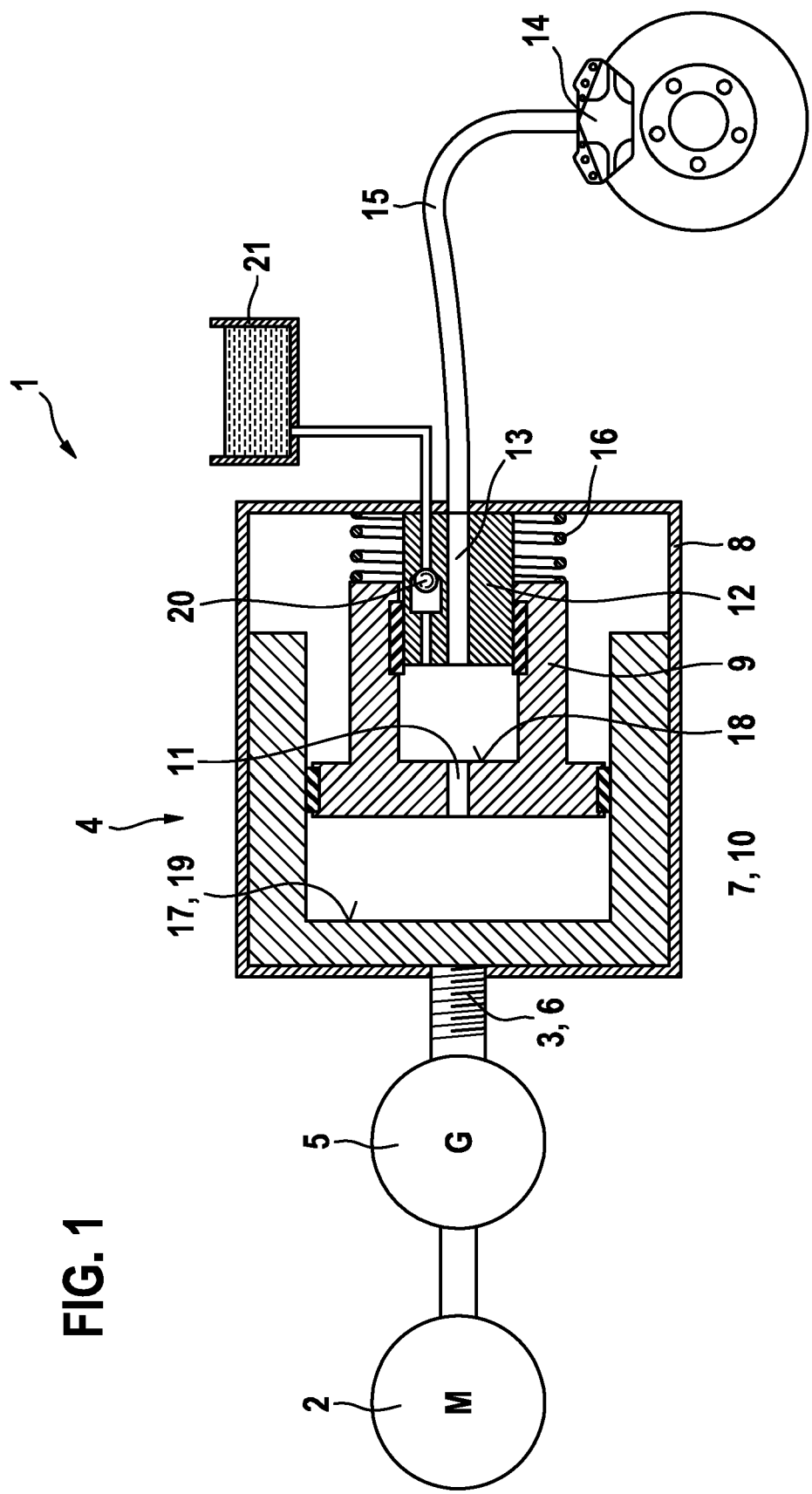
FIGS. 1 and 2 show circuit diagrams of example electrohydraulic brake actuators in accordance with the present invention.

The example electrohydraulic brake actuator 1 according to the present invention shown in FIG. 1 has an electric motor 2, a spindle drive 3 and a piston-cylinder unit 4. In the two illustrated and described specific embodiments of the present invention, a mechanical reduction gear 5 is interposed between electric motor 2 and spindle drive 3, which is not essential for the present invention, however. Reduction gear 5 is in particular a pinion drive and for example a planetary gear. Electric motor 2 is able to drive spindle drive 3 in rotating fashion via reduction gear 5, if present.

In the two illustrated and described specific embodiments of the present invention, spindle drive 3 is a ball screw; other spindle drives 3 are possible. Generally, spindle drive 3 may be understood as a rotation-translation conversion gear 6, which converts a rotational movement of electric motor 2 or of reduction gear 5 into a displacement, which displaces a piston 7 in a cylinder 8 of piston-cylinder unit 4. Instead of spindle drive 3, a cam drive, a crankshaft drive, a cam gear or a rack-and-pinion drive are also possible for example (not shown). The list is provided by way of example and is not exhaustive.

In FIG. 1, piston-cylinder unit 4 has two pistons 7, 9, of which a first piston 7 is a hollow piston 10, which is displaceable in cylinder 8 via spindle drive 3. A second piston 9 is likewise a hollow piston, which is displaceable in first piston 7. First piston 7 and second piston 9 enclose a volume, whose size is variable by a displacement of the two pistons 7, 9 relative to each other. By a displacement of first piston 7 in the direction of second piston 9, the volume in first piston 7 designed as hollow piston 10 is reduced and brake fluid is displaced from first piston 7 through a center hole 11 in a piston bottom of second piston 9 into second piston 9 that is likewise designed as a hollow piston.

Second piston 9 is displaceable on a fixed piston 12 fixedly situated in cylinder 8 of piston-cylinder unit 4, whereby a volume is variable in the second piston 9 designed as a hollow piston. By a displacement of second piston 9 on fixed piston 12, the volume in second piston 9 is reduced and brake fluid is displaced from second piston 9 through a center hole 13 in fixed piston 12 into a hydraulic wheel brake 14, which is connected to cylinder 8 of piston-cylinder unit 4 via a brake hose 15. It is also possible for multiple wheel brakes 14 to be connected to piston-cylinder unit 4 (not shown).

A piston spring 16 supports second piston 9 in cylinder 8.

In order to operate wheel brake 14, electric motor 2 displaces first piston 7 via reduction gear 5 and spindle drive 3, which forms the rotation-translation conversion gear 6, in cylinder 8 of piston-cylinder unit 4 and on second piston 9, piston spring 16 initially retaining second piston 9 against being displaced along with first piston 7. The displacement of first piston 7 on second piston 9 reduces the volume in first piston 7 designed as hollow piston 10 so that brake fluid is displaced from first piston 7 through center hole 11 in the piston bottom of second piston 9 into second piston 9, which is likewise designed as a hollow piston. A brake pressure is thereby generated in cylinder 8 and, respectively, in the two pistons 7, 9 of piston-cylinder unit 4 and in the wheel brake 14 connected to piston-cylinder unit 4, and wheel brake 14 is operated.

As soon as the brake pressure overcomes a spring force of piston spring 16, which supports second piston 9 against being displaced along, or first piston 7 strikes against second piston 9, second piston 9 is displaced together with first piston 7 on fixed piston 12 so that the volume in second piston 9, likewise designed as a hollow piston, is reduced and brake fluid is displaced into wheel brake 14. When first piston 7 strikes against second piston 9, the two pistons 7, 9 are displaced jointly and no longer against each other so that the volume no longer changes in first piston 7 and no more brake fluid is displaced from first piston 7. The brake pressure is now only increased by the displacement of second piston 9 on fixed piston 12, whose pressure-generating piston surface 18 is smaller than a pressure-generating piston surface 17 of first piston 7. Pressure-generating piston surfaces 17, 18 of the two pistons 7, 9, designed as hollow pistons, of piston-cylinder unit 4 of the electrohydraulic brake actuator 1 according to the present invention are radial inner surfaces of the piston bottoms of the two pistons 7, 9. Due to the smaller pressure-generating piston surface 18 of second piston 9, a displacement force, which is required for displacing the two pistons 7, 9 in cylinder 8, is smaller when first piston 7 abuts on second piston 9 and when both pistons 7, 9 are displaced together and without displacement against each other and thus without a change in the volume in first piston 7. This reduces a displacement force for displacing the two pistons 7, 9 in order to increase pressure, after initially a brake pressure was generated by displacing the first piston 7 on second piston 9. This reduces a pressure-generating piston surface 17, 18 of the two pistons 7, 9 or of piston-cylinder unit 4 in the displacement of pistons 7, 9 in cylinder 8 of piston-cylinder unit 4 during a pressure buildup. Initially, first piston 7 displaces a large brake fluid volume, whereby wheel brake 14 is applied quickly and a brake pressure is generated quickly. Subsequently, the displacement of second piston 9 on fixed piston 12 increases the brake pressure using a smaller displacement force.

The piston bottom of first piston 7, which strikes against second piston 9 and displaces second piston 9 along with first piston 7, may also be understood generally as a driver device 19. Other driver devices are also possible, for example inwardly extending ribs, lugs, an annular step or pegs projecting from the piston bottom, by which the volume in first piston 7 is not reduced to zero when it strikes against second piston 9 (not shown).

Via an axially parallel bore in fixed piston 12, in which a non-return valve 20 is situated, a brake fluid reservoir 21 communicates with the volume in second piston 9. From brake fluid reservoir 21, brake fluid is able to flow through non-return valve 20 into piston 9, which results in a brake pad wear of wheel brake 14.

Figure 2:
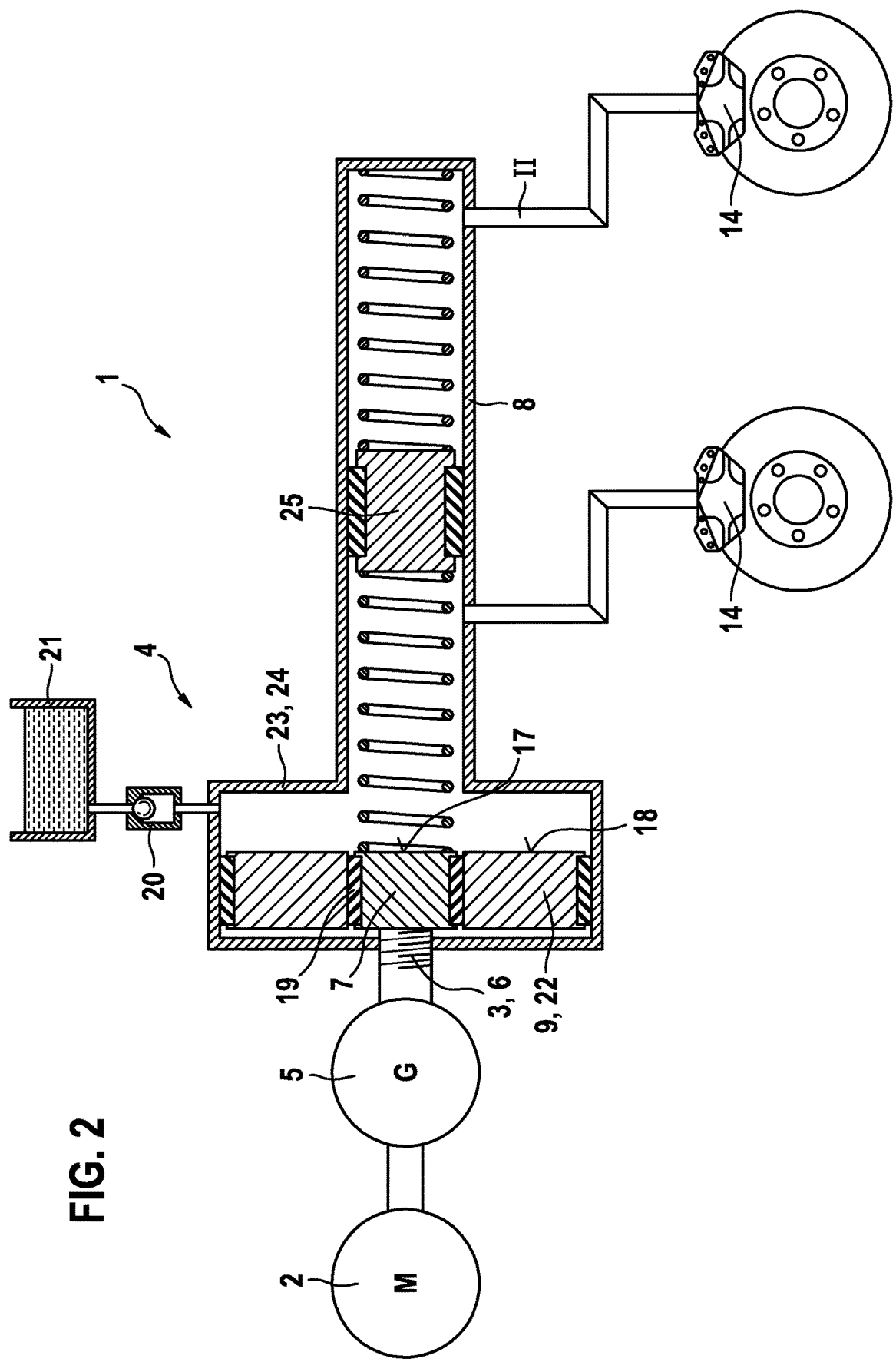

In the explanation of FIG. 2 below, elements agreeing with FIG. 1 are designated by the same reference numerals as in FIG. 1. The example electrohydraulic brake actuator 1 according to the present invention shown in FIG. 2 has an annular piston 22 as second piston 9, which encloses a first piston 7 designed as a solid piston. As in FIG. 1, first piston 7 is displaceable by an electric motor 2 via a mechanical reduction gear 5, which is not essential for the invention, and a spindle drive 3 as rotation-translation conversion drive 6 in a cylinder 8 of a piston-cylinder unit 4. Due to friction between the two pistons 7, 9, the second piston 9 designed as an annular piston is displaced along with first piston 7 so that a brake pressure is generated in cylinder 8 initially jointly by both pistons 7, 9. The pressure-generating piston surfaces 17, 18 of the two pistons 7, 9 displace a large quantity of brake fluid and effect a quick generation of a brake pressure in a hydraulic wheel brake 14 connected to cylinder 8 of piston-cylinder unit 4. Wheel brake 14 is thereby applied and operated quickly.

In FIG. 2, cylinder 8 has an annular step 23, at which its diameter is reduced from an outer diameter of second piston 9 to a diameter of first piston 7. When second piston 9 strikes against annular step 23, which may also be generally understood as piston stop 24, it is not displaced further, but rather only first piston 7 is displaced in a section of a smaller diameter of diameter-stepped cylinder 8. As a result, a pressure-generating piston surface for increasing the brake pressure in cylinder 8 is smaller, namely, only the pressure-generating piston surface 17 of first piston 7. A displacement force for displacing first piston 7 for increasing the brake pressure in cylinder 8 of piston-cylinder unit 4 of the electrohydraulic brake actuator 1 according to the present invention and in the connected wheel brake 14 is thereby smaller than it would be if both pistons 7, 9 were displaced together. In the specific embodiment of the present invention shown in FIG. 2, a pressure-generating piston surface 17, 18 is also reduced when pistons 7, 9 are displaced in cylinder 8 during a pressure buildup.

A driver device 19 for displacing second piston 9 along with first piston 7 is formed by a frictionally engaged connection between the two pistons 7, 9.

For compensating for brake pad wear, cylinder 8 communicates with a brake fluid reservoir 21 via a non-return valve 20 through which brake fluid is able to flow in the direction of cylinder 8.

In the section having the smaller diameter of cylinder 8 of piston-cylinder unit 4 of the brake actuator 1 according to the present invention from FIG. 2, a floating piston 25 is situated, which has brake pressure applied to it on a side facing the first and the second piston 7, 9, which is generated by the first and the second piston 7, 9. A side of floating piston 25 facing away from the first and the second piston 7, 9 generates a brake pressure in cylinder 8 on a side of floating piston 25 facing away from the first and the second piston 7, 9, where another hydraulic wheel brake 14 is connected. Piston-cylinder unit 4 of electrohydraulic brake actuator 1 from FIG. 2 thereby operates two hydraulic wheel brakes 14 in a manner hydraulically separated from each other, as is in conventional master brake cylinders operated by muscle power or auxiliary power. It is possible for more than one hydraulic wheel brake 14 to be connected on cylinder 8 respectively on both sides of floating piston 25 (not shown). Cylinder 8, on the side of floating piston 25 facing away from the first and the second piston 7, 9, and the wheel brake 14 connected there may also be understood as a second brake circuit II.

The brake fluid reservoir 21 shown in the figures is not essential for the present invention, it also being possible to design brake actuators 1 as closed systems without brake fluid reservoir 21.

What is claimed is:

1. An electrohydraulic brake actuator for generating a brake pressure for operating one or multiple hydraulic wheel brakes of a motor vehicle, comprising:
    a piston-cylinder unit configured to generate the brake pressure and that includes a cylinder and a piston;
    a rotation-translation conversion drive; and
    an electric motor configured to drive the rotation-translation conversion drive to convert a rotational drive movement of the electric motor into a displacement that displaces the piston in a displacement direction within the cylinder of the piston-cylinder unit;
    wherein:
        a surface of the piston that extends perpendicular to, and faces in, the displacement direction and that acts on a pressure medium in the cylinder is reduced during the displacement of the piston within the cylinder when generating pressure so that the surface of the piston acting on the pressure medium during a first stage of the displacement of the piston is greater than the surface of the piston acting on the pressure medium during a subsequent second stage of the displacement; and
    at least one of the following two features (a) and (b) is present:
        (a) the piston includes (1) a first piston section that is hollow and that is displaceable in the cylinder by way of the rotation-translation conversion drive, and (2) a second piston section against which the hollow first piston section strikes due to displacement of the first piston section in the first stage, thereby causing the first piston section to displace the second piston second along with the first piston section in the second stage; and
        (b)(1) the surface of the piston includes a first surface portion and a second surface portion, (2) the first surface portion acts on the pressure medium during the first stage, (3) the second surface portion, and not the first surface portion, acts on the pressure medium during the second stage, and (4) the first and second surface portions are displaced relative to each other during the first stage and not during the second stage.

2. The electrohydraulic brake actuator as recited in claim 1, wherein the piston includes:
    the first piston section that is hollow and that is displaceable in the cylinder by way of the rotation-translation conversion drive; and
    the second piston section against which the hollow first piston section strikes due to displacement of the first piston section in the first stage, thereby causing the first piston section to displace the second piston second along with the first piston section in the second stage.

3. The electrohydraulic brake actuator as recited in claim 2, wherein:
    an interior surface area of the first piston section that faces in the displacement direction is greater than an interior surface area of the second piston section that faces in the displacement direction;
    the interior surface area of the first piston section acts on the pressure medium in the cylinder during the first stage, thereby causing an initial build-up of pressure;
    the interior surface area of the second piston section acts on the pressure medium in the cylinder during the second stage without the interior surface area of the first piston section acting on the pressure medium in the cylinder during the second stage, thereby causing a second build-up of pressure; and
    the second build-up of pressure is at a lower rate than the first build-up of pressure.

4. The electrohydraulic brake actuator as recited in claim 2, wherein the reduction of the surface occurs due to the first piston section being displaced relative to the second piston section.

5. The electrohydraulic brake actuator as recited in claim 1, wherein the piston-cylinder unit has a brake fluid reservoir for compensating for brake pad wear.

6. The electrohydraulic brake actuator as recited in claim 1, wherein:
    the surface of the piston includes the first surface portion and the second surface portion;
    the first surface portion acts on the pressure medium during the first stage;
    the second surface portion, and not the first surface portion, acts on the pressure medium during the second stage; and
    the first and second surface portion are displaced relative to each other during the first stage and not during the second stage.

7. An electrohydraulic brake actuator for generating a brake pressure for operating one or multiple hydraulic wheel brakes of a motor vehicle, the electrohydraulic brake actuator comprising:
    a piston-cylinder unit configured to generate the brake pressure and that includes a cylinder and a piston;
    a rotation-translation conversion drive; and
    an electric motor configured to drive the rotation-translation conversion drive to convert a rotational drive movement of the electric motor into a displacement that displaces the piston in a displacement direction within the cylinder of the piston-cylinder unit;
    wherein:
        a surface of the piston that extends perpendicular to, and faces in, the displacement direction and that acts on a pressure medium in the cylinder is reduced during the displacement of the piston within the cylinder when generating pressure so that the surface of the piston acting on the pressure medium during a first stage of the displacement of the piston is greater than the surface of the piston acting on the pressure medium during a subsequent second stage of the displacement;

the piston-cylinder unit is configured to generate pressure in a first brake circuit and to generate pressure in a second brake circuit;

the piston-cylinder unit further includes a floating piston configured to affect the generation of the pressure in the second brake circuit by a first side of the floating piston applying pressure to the second brake circuit in response to the piston applying brake pressure to a second side of the floating piston; and the application of the brake pressure to the second side of the floating piston occurs by the displacement of the piston caused by the rotation-translation conversion drive.

8. The electrohydraulic brake actuator as recited in claim 7, wherein the piston has two piston sections that are displaced jointly for an initial build-up of pressure during the first stage, and of which only one is displaced during the second stage further for a further build-up of pressure during the second stage.

9. The electrohydraulic brake actuator as recited in claim 8, wherein the piston-cylinder unit has a driver arrangement to drive the two piston sections to move jointly during the first stage.

10. The electrohydraulic brake actuator as recited in claim 8, wherein the rotation-translation conversion drive displaces a first of the two piston sections in the cylinder, and a second of the two piston sections is displaced along with the first piston section in the cylinder until a brake pressure in the cylinder is so great that the brake pressure overcomes a friction between the two piston sections or until the second piston section strikes against a piston stop.

11. The electrohydraulic brake actuator as recited in claim 7, wherein:

the piston has a first piston section and a second piston section;

both of the first and second piston sections act on the pressure medium during the first stage;

only one of the first and second piston sections acts on the pressure medium during the second stage; and the first and second piston sections are displaceable relative to each other.

12. The electrohydraulic brake actuator as recited in claim 7, wherein the piston includes first and second sections that are displaced relative to each other during the second stage and not during the first stage.

* * * * *